(12) United States Patent
Mullen

(10) Patent No.: US 11,995,642 B1
(45) Date of Patent: May 28, 2024

(54) CARDS, DEVICES, SYSTEMS, AND METHODS FOR A NOTIFICATION SYSTEM

(71) Applicant: Dynamics Inc., Cheswick, PA (US)

(72) Inventor: Jeffrey D. Mullen, Pittsburgh, PA (US)

( * ) Notice: Subject to any disclaimer, the term of this patent is extended or adjusted under 35 U.S.C. 154(b) by 0 days.

(21) Appl. No.: 14/017,444

(22) Filed: Sep. 4, 2013

Related U.S. Application Data

(60) Provisional application No. 61/697,153, filed on Sep. 5, 2012.

(51) Int. Cl.
  *G06Q 40/00* (2023.01)
  *G06Q 20/34* (2012.01)
(52) U.S. Cl.
  CPC .................. *G06Q 20/351* (2013.01)
(58) Field of Classification Search
  CPC . G06Q 20/02; G06Q 30/0603; G06Q 20/4014
  USPC .......................................................... 705/44
  See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

Wikipedia ("Graphical user interface" http://en.wikipedia.org/wiki/Graphical_user_interface. Dec. 1, 2005).*

(Continued)

*Primary Examiner* — Mike Anderson
*Assistant Examiner* — Mark H Gaw
(74) *Attorney, Agent, or Firm* — MORRIS LAW GROUP; Robert W. Morris

(57) ABSTRACT

A user is provided with a GUI that may allow the user to change functionality associated with a non-powered card, a powered card or other device (e.g., a mobile telephonic device). The functionality associated with the device may be displayed by the GUI as a list of third-party applications that may be executed when the user's card or other device is used to complete a purchase transaction. The GUI allows the user to receive and view notifications sent from the third-party application developer via a remote facility that may, for example, allow the third-party application developer to promote the third-party application.

3 Claims, 8 Drawing Sheets

(56) References Cited

U.S. PATENT DOCUMENTS

| | | | |
|---|---|---|---|
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Weiss |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,747,523 B2 * | 6/2010 | Cohen ............... G06Q 20/108 705/39 |
| 7,828,207 B2 | 11/2010 | Cooper |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |

(56) References Cited

U.S. PATENT DOCUMENTS

| | | |
|---|---|---|
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0111770 A1* | 5/2007 | Van Luchene ......... G06Q 50/10 463/7 |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0192249 A1 | 12/2007 | Biffle et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massacusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0006254 A1* | 1/2009 | Mumm ................ G06Q 20/351 705/44 |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

Eaton, Kit (Credit Cards Will Go Electronic, Then Disappear Into iPhone 5, Fast Company, https://www.fastcompany.com/90780243/how-to-build-a-winning-analytics-team, Oct. 5, 2010) (Year: 2010).*

U.S. Appl. No. 60/594,300, Poidomani et al.

U.S. Appl. No. 60/675,388, Poidomani et al.

The Bank Credit Card Business. Second Edition, American Bankers Association, Washington, D.C., 1996.

A Day in the Life of a Flux Reversal. http://www.phrack.org/issues.html?issue=37&id=6#article. As viewed on Apr. 12, 2010.

Dynamic Virtual Credit Card Numbers. http://homes.cerias.purdue.edu/~jtli/paper/fc07.pdf. As viewed on Apr. 12, 2010.

English translation of JP 05210770 A.

* cited by examiner

CARDS, DEVICES, SYSTEMS, AND METHODS FOR A NOTIFICATION SYSTEM

CROSS-REFERENCE TO RELATED APPLICATION

This application claims the benefit of U.S. Provisional Patent Application No. 61/697,153, titled "CARDS, DEVICES, SYSTEMS, AND METHODS FOR A NOTIFICATION SYSTEM," filed Sep. 5, 2012, which is hereby incorporated by reference herein in its entirety.

BACKGROUND OF THE INVENTION

This invention relates to magnetic cards and devices and associated payment systems.

SUMMARY OF THE INVENTION

Systems and methods are provided for allowing a user to select an additional service to be performed in addition to the purchase of goods with a payment card or other device (e.g., a mobile telephonic device, a tablet computer device, or another electronic device). A card, or other device, may include one or more buttons. A user may associate an additional service to a button of a card at any time. At the time of purchase, information indicative of the button that the user selected may be passed to a point-of-sale system with a user's payment information. Such data may be, for example, communicated through a merchant acquirer's network to a processing facility. The processing facility may, for example, authorize a payment transaction and forward the information indicative of the button a user selected and the identity of a user to a remote facility. Such a remote facility may, for example, forward at least some of such information, as well as additional information, to a third party application such that the third party application enacts the additional feature desired by the user.

Such an additional feature may include, for example, a game action in an online game by a game application, a check-in operation at a location by a check-in application, redemption of a coupon or voucher by a third party application, accumulation of loyalty points by a third party loyalty application, a charitable donation operation by a charitable third-party application, rating of a transaction or location by a rating application, any combination of such features, or any additional feature.

Selection of an application may be provided, for example, by a Graphical User Interface (GUI) provided on a computing device (e.g., a mobile telephonic device) as a software application for that device or via the internet or an intranet through a web browser. Such a selection may be provided with a non-powered card such that a single feature may be associated with a card for a period of time. Such a selection may be associated to an option (e.g., a button) on a powered card or other device (e.g., a mobile telephonic device) such that the user may associate different features with different options (e.g., different buttons). Accordingly, for example, a user may receive a powered card, or other device, in the mail and use his/her web browser to associate different additional features to different buttons. The user may then utilize the card in a store and press a button in order to select that feature. A card, or other device, may download information (e.g., via a wireless communication, a light-based communication, or an electromagnetic communication) such that the card, or other device, displays information next to an option indicative of the application (e.g., "Toys for Tots" or "UpperDeck"). Alternatively, no download may be provided and no additional information may be displayed such that a user's card, or other device, includes a generic descriptor (e.g., "credit" and "application," or "application 1" and "application 2," or "debit" and "application 1" and "application 2").

A remote facility may also receive additional information other than just a user identifier and information indicative of the option selected by a user (or that the user made a payment). Such additional information may be, for example, the type of merchant (e.g., a retail merchant or a gas merchant), the location of a merchant (e.g., the zip code of a merchant), the type of transaction (e.g., online or in-store purchase), the name of the merchant (e.g., "Amazon.com," or "Walmart"), the amount of the transaction (e.g., $10.25), and any other information. Such a remote facility may forward such information to a third-party application in addition to information generated by the remote facility (e.g., a second user identifier such that different identifiers are used with the facility sending payment information and the third-party application).

An ecosystem may be provided in which a development kit is available for third parties to develop applications for payment cards or other devices. A GUI may be provided where a user can select different third-party applications to be associated with a user's payment card or other device. The third-party applications may need to be approved by an administrator before being accessible by a GUI. Different categories of third-party applications may be provided on the GUI (e.g., a coupon category, a check-in category, a games category, a charity category). The development kit may provide the ability for a third-party application to, for example, receive user identification numbers and other information (e.g., merchant name and location) and provide particular information back (e.g., within a period of time) to a remote facility.

The development kit may provide for a third-party application to, for example, send notifications via the remote facility to users of their applications for various reasons (e.g., promotions). A remote facility may charge a fee (e.g., a $0.10 flat fee) to the third-party for each notification sent by the third-party application to one of its users. A remote facility may limit the number of notifications that may be sent to by a third party to a user (e.g., no more than one notification per user per quarter). A remote facility may, for example, be required to verify that a third-party application has been associated with a user's card or device before the third-party may send a notification to a user.

Information received from a third-party application may include, for example, information indicative that the user was properly identified and a service was performed (e.g., "piggyback operation successful," "charity donation made."). Such information may be provided back to an issuing bank, processor, or other service provider such that the information may be displayed on a user's bill statement. Additional information may also be provided that may change the way a transaction is authorized or settled.

Additional information received from a third party may be utilized to change the way a transaction is authorized or settled. For example, a third party may provide a user with the ability to pre-purchase a voucher to a particular store (e.g., a particular barber in a particular zip code). A user may associate this third party service to a button on the user's card. A user may make a purchase at this barber multiple times during a year on the user's credit account. The user may, at one such purchase, press the button associated with the desire to use the third-party service and redeem a voucher the user already purchased or acquired. Information indicative of the user's desire to utilize such a service may be communicated to a point-of-sale terminal via a communications device located on the card (e.g., a dynamic magnetic stripe communications device, an RFID antenna, an exposed IC chip (e.g., an EMV chip), or any other communications device). The transaction may be authorized using the user's payment account if, for example, the user has enough funds associated with that account (e.g., a credit or debit account). The third-party service provider may then determine the user had a pre-paid voucher for the transaction and may return to the card issuer, processor, or other party information indicative that the user's bill is to be adjusted by the amount of the voucher. Before, or after, settlement occurs a user's bill may show a statement credit in the amount of the voucher. A remote facility may perform such a data exchange as well as any associated value exchange. For example, the remote facility may, for a fee (e.g., a percentage of a transaction or a fixed fee), provide value from the third-party service provider to the card issuer or processor (e.g., via an ACH or other type of monetary transaction). Alternatively, for example, the remote facility may provide the desired value to the card issuer, processor, or other party and demand the associated value be paid to the remote facility by the third-party application within a period of time (e.g., three days). Information provided by a third-party application to a remote facility may include an identifier indicative of the third-party application, an identifier indicative of the user, an identifier indicative of the type of service provided by the third-party application, an identifier indicative of the transaction with which further action by the third-party application is desired, an amount of a post-statement credit that is to be applied for a particular transaction, an amount of a post-settlement credit that is to be applied for a particular transaction, an amount of a pre-settlement credit that is to be applied for a particular transaction, an amount of a credit that is to be applied during an authorization, an additional fee that is supposed to be added to a statement for an additional service (e.g., a fee-based financial management tool service), and any other information desired by the third-party service provider, processor, card issuer, remote facility, device provider, or any other entity (e.g., a card network).

Information indicative of a button press, or use of a card, that triggers a feature may be provided in a payment message utilized at authorization or at settlement. Furthermore, the service provider may return information in a period of time that permits actions to be performed pre-authorization or pre-settlement.

The payment actions may be determined, for example, via a user interaction with the card. Particularly, for example, a user may press a button on the card from a group of buttons that is associated with the third-party feature. Such third-party features may be unique from the features provided to the user via the third parties non-payment card or device services. Accordingly, a user may obtain the benefit of the whimsical and festive nature of a unique feature every time the user makes a payment. Information indicative of feature selection may be provided, for example, via an output device operable to be read by a card reader. For example, the feature may be provided by a dynamic magnetic stripe communications device, an RFID antenna, an exposed IC chip, or any other type of card reader communications device. For online purchases, for example, a display may be provided on the card and a user selection may cause a particular number (e.g., a particular code) to be displayed on the card. Such a code may be entered into a text box on a website at checkout and may be representative of the user's desired feature. Accordingly, the feature may be communicated to a remote server such that the feature may be performed in the third party service on behalf of the user. The code may additionally provide the benefits of a security code and may be entered with a payment card number (e.g., a credit or debit card number) at online or in-store checkout.

Rewards may be awarded based on the amount of a purchase. Such rewards may be associated with a third-party service or a card issuer, device or card provider, or other entity. For example, an amount of game currency may be awarded by a game provider at every purchase instead of a card issuer providing an amount of points, miles, or cashback to a user. Alternatively, for example, a user may earn both rewards from a card issuer as well as rewards from a third-party service provider. A user may select, via, for example, physical buttons on the card or virtual buttons on a capacitive-sensitive display of a mobile telephonic device, the type of feature the user desires. Multiple features may be provided from a particular third-party service provider. For example, a game service provider may provide a feature associated with one game action and another feature associated with another game action.

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of, for example, a feature (e.g., a payment feature). The code may be received by the card via manual input (e.g., onto buttons of the card) or via a wireless transmission (e.g., via light, electromagnetic communications, sound, or other wireless signals). A code may be communicated from a webpage (e.g., via light and/or sound) to a card. A card may include a display such that a received code may be visually displayed to a user. In doing so, the user may be provided with a way to select, and use, the code via both an in-store setting (e.g., via a magnetic stripe reader) or an online setting (e.g., by reading the code from a display and entering the code into a text box on a checkout page of an online purchase transaction). A remote server, such as a payment authorization server, may receive the code and may process a payment differently based on the code received. For example, a code may be a security code to authorize a purchase transaction. A code may provide a payment feature such that a purchase may be made with points, debit, credit, installment payments, or deferred payments via a single payment account number (e.g., a credit card number) to identify a user and a payment feature code to select the type of payment a user desires to utilize.

A dynamic magnetic stripe communications device may include a magnetic emulator that comprises an inductor (e.g., a coil). Current may be provided through this coil to create an electromagnetic field operable to communicate with the read-head of a magnetic stripe reader. The drive circuit may fluctuate the amount of current travelling through the coil such that a track of magnetic stripe data may be communicated to a read-head of a magnetic stripe reader. A switch (e.g., a transistor) may be provided to enable or disable the flow of current according to, for example, a frequency/double-frequency (F2F) encoding algorithm. In doing so, bits of data may be communicated.

Electronics may be embedded between two layers of a polymer (e.g., a PVC or non-PVC polymer). One or more liquid polymers may be provided between these two layers. The liquid polymer(s) may, for example, be hardened via a reaction between the polymers (or other material), temperature, or via light (e.g., an ultraviolet or blue spectrum light) such that the electronics become embedded between the two layers of the polymer and a card is formed.

A payment card or other device may receive information indicative of a feature desired to be added by a user. The payment card may communicate information indicative of the feature with payment card data associated with the card or a user selection. The payment data and feature information may be routed, for example, to an authorization server. The authorization server may authorize payment and, based on the authorized payment, communicate the feature information to a remote server. The remote server may utilize this remote information to impact a third-party service. The feature information may, for example, be routed before the payment card data reaches an authorization server. At merchant settlement, charge backs for a purchase associated with a game action may cause the feature to be reversed or a different feature to be implemented (e.g., a removal of rewards earned at authorization). The feature may be implemented at settlement upon confirmation that, for example, no chargeback was associated with the payment transaction.

A graphical user interface (GUI) may be used by a user to help the user in selecting various features to be added by the user. The GUI may, for example, be accessible via a network (e.g., the internet) and may be rendered onto a device (e.g., a mobile telephonic device, a tablet computer device, or another electronic device) to allow the user to select the one or more features to be performed by third-party applications in addition to an initial transaction (e.g., a purchase transaction) that the user may have requested.

A GUI may be accessed, for example, via a web browser of a card or other device (e.g., a mobile telephonic device, a tablet computer device, or another electronic device) in order to render a list of third-party applications that may be currently featured to aid the user in his or her selection. For example, a "featured" tab may be rendered by the GUI onto a device's web browser to allow the user to access third-party applications that may be of interest to the user. A "currently featured" sub-tab may be rendered by the GUI onto a device's web browser to allow the user to access third-party applications that are currently being featured. Currently featured third-party applications may achieve "currently featured" status any number of different ways, which may include being a newly added third-party application, a newly added component to an existing third-party application, an existing third-party application that has not achieved "currently featured" status after a threshold amount of time, or any other way.

Third-party applications not achieving "currently featured" status may be categorized into a different status category (e.g., "previously featured"). Third-party applications achieving "previously featured" status may achieve such a status any number of ways, which may include being removed from the "currently featured" status category. Accordingly, for example, any active third-party application may either exist in the "currently featured" status category or the "previously featured" status category.

A third-party application may exist in either of the "currently featured" or the "previously featured" status categories and may be selected by a user via the GUI that is rendered onto the user's card or other device. Third-party applications may, for example, be advertised in either of the "currently featured" or "previously featured" categories and the "currently featured" and/or the "previously featured" lists of third-party applications may be activated via a user event within the GUI (e.g., the user may mouse-over to a tab in the GUI and activate the tab using a mouse click).

Once a status category is selected, a list of third-party applications belonging to the selected status category may be rendered by the GUI onto the user's display. If more third-party applications exist than may be rendered onto the display, the GUI may render a scroll bar onto the user's display so that the user may individually scroll through the list of advertisements for the third-party applications that may exist within the selected category.

Within each advertisement, summary information may be rendered by the GUI onto the display of the user's card or other device. Other person-machine interface (PMI) components (e.g., virtual buttons) may be rendered onto each advertisement by the GUI to allow a user to obtain detailed information about the selected third-party application within the selected category. For example, a "learn more" button may be rendered within the summary advertisement of the selected third-party application within the selected category that when pressed (e.g., by a mouse-over click event) may render detailed content concerning the selected third-party application.

The detailed content may, for example, provide details as to the added functionality of the third-party application when a transaction (e.g., a purchase transaction) is performed subsequent to the activation of the third-party application. For example, the detailed content may explain that when purchases are made with the third-party application being activated, certain events may occur (e.g., any purchase valued at $10 or more made at any merchant retail outlet may cause a sports/entertainment card from UpperDeck to be emailed to the user's card or other device). As per another example, the detailed content may explain that when purchases are made with the third-party application being activated, certain events may occur (e.g., a piggyback transaction of $1.50 may be added to any merchant's transaction amount to cause seven sports/entertainment cards from UpperDeck to be emailed to the user's card or other device).

A user may be given an opportunity to customize the added features of a third-party application via the detailed content rendered by the GUI. For example, a user may choose a particular category of sports/entertainment cards (e.g., football cards) such that when purchases are made with that particular third-party application being activated, virtual football cards may be emailed to the user when qualifying purchases are made. Links to cards received by the user may be added by the GUI and rendered on the display of the user's card or device. A link may be activated (e.g., by a mouse-over and click event) by the GUI to allow the user to view a representation of a particular sports/entertainment card and select that particular sports/entertainment card received by the user (e.g., emailed to the user) after a qualifying event (e.g., a purchase having a qualifying purchase amount) occurs.

Third-party applications existing in the "previously featured" status category may be selected by a user via the GUI that is rendered onto the user's card or other device. Summary information about the previously featured third-party application may include information (e.g., the date that the third-party application was originally featured). "Learn more" virtual buttons may also be rendered within the "previously featured" third-party application summaries so that detailed information may be rendered onto the user's display when the "Learn More" virtual buttons are activated. Third-party applications previously activated by the user may be communicated as such to the user via the GUI, so that the user may be reminded as to which of the currently featured and/or previously featured third-party applications have been associated with the user's powered or non-powered card.

Detailed content may include control devices (e.g., mouse-over control tabs) to allow a user to perform further processing on any one or more of any currently featured and/or previously featured third-party applications. Such control devices may, for example, allow a user to rate the third-party application (e.g., enter a "1" for a poor rating, a "5" for an excellent rating and numbers "2" through "4" for ratings ranging between poor and excellent).

Other control devices (e.g., textual input boxes) of a GUI may allow a user to provide a rating as to the user's experience with a particular third-party application. Once a user has entered his or her rating, the rating may be made available to other users' GUIs. Accordingly, for example, other users that may be contemplating associating third-party applications with the operation of their card or device may read other users' experiences and associated ratings with prospective third-party applications to aid in their decision.

Users' experience ratings may, for example, be processed by a remote facility and then propagated to other users via the remote facility. A remote facility may, for example, have access to a database or repository that stores other users' ratings, such that when detailed content concerning one or more third-party applications is to be rendered onto a user's display by the user's GUI, the experience ratings may be retrieved from the database or repository and then displayed on the user's display as may be necessary. A remote facility may, for example, have access to a social network (e.g., twitter or facebook), such that the experience rating provided by the user may be shared with the social network and then propagated to other users of the social network so that they may read about the user's experience.

A notification system may be provided by a remote facility so that third-party application developers may submit notifications to their third-party users. The notification system may, for example, limit a third-party application developer to provide notifications only to those users who have previously associated a third-party application developer's application to the user's card or other device. The notification system may, for example, limit a third-party application developer to provide notifications only to those users who are currently associating that third-party application developer's application to the user's card or other device. Alternately, for example, a remote facility may, for a fee, allow one or more third-party application developers to solicit potential users to their applications by allowing the third-party application developers to send advertisement notifications to prospective users.

A notification system may, for example, provide value to a third-party application developer by allowing the third-party application developer to send promotions to users via a remote facility. Such a notification system may compensate the remote facility by charging a fee (e.g., a flat fee) to the third-party application developer for each notification sent to each user.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
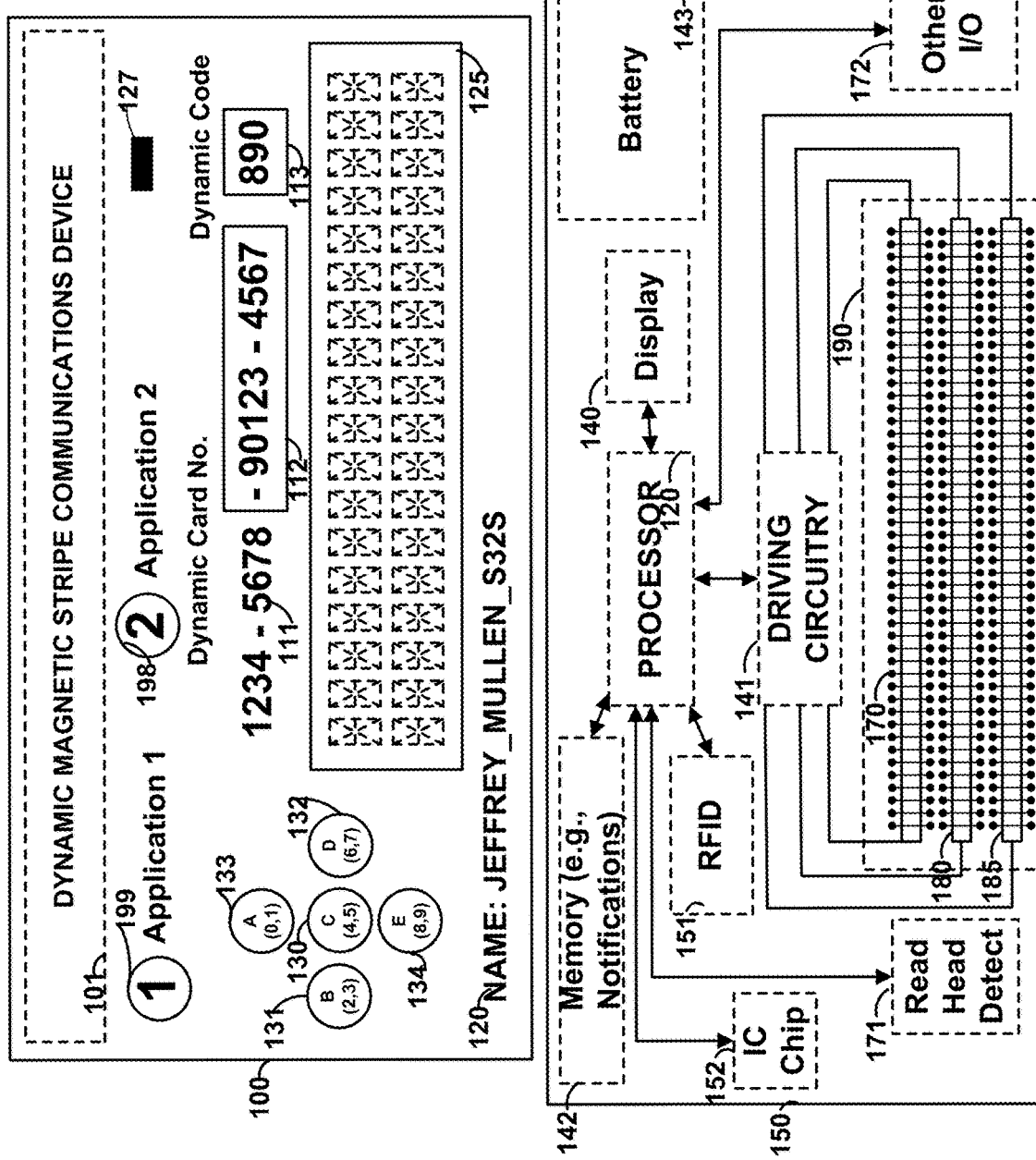
FIG. 1 is an illustration of a card and architecture constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or a non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination of mechanical and capacitive buttons.

Card 100 may include button 199. Button 199 may be used, for example, to communicate information through dynamic magnetic stripe communications device 101 indicative of a user's desire to communicate the selection of a third-party application. Persons skilled in the art will appreciate that pressing a button (e.g., button 199) may cause information to be communicated through device 101 when an associated read-head detector detects the presence of a read-head of a magnetic stripe reader. Button 198 may be utilized to communicate (e.g., after button 198 is pressed and after a read-head detects a read-head of a reader) information indicative of a user selection (e.g., to communicate details of a different third-party application that is selected).

Multiple buttons may be provided on a card and each button may be associated with different user selections. Light sensor 127 may be provided, for example, to receive information from a display (e.g., a display of a mobile telephonic device or a display of an electronic tablet). Display 125 may allow a user to select (e.g., via buttons) options on the display that instruct the card to communicate (e.g., via a dynamic magnetic stripe communications device, RFID, or exposed IC chip) to use a debit account, credit account, pre-paid account, or point account for a payment transaction.

Button 198 and button 199 may each be associated with, for example, a third-party application and may be changed by a user at any time. The third-party application associated with a button may be changed by a user on a GUI (e.g., a web-based GUI) provided by a device provider, remote facility provider, card issuer, processor, or any other entity. For example, a third-party service provider may, on its website or application, allow a user to change the third-party application that is executed when the third party's application button is selected by a user on the user's card or other device.

The selection of a third-party application may or may not have a cost associated with it. If a cost is associated with the third-party application, for example, the cost may be added to a customer's statement (e.g., added to a credit or debit purchase) for a particular transaction. A fixed-fee or variable-fee (e.g., a percentage of the transaction) may then be removed from the fee charged to the user and distributed among particular parties (e.g., distributed among the card issuer and/or device provider). The remainder of the fee may be provided, for example, to the third-party service provider. A cost may be associated with a third-party application selection, but may not be a cost to a user. Instead, for example, the cost may be a cost to a third-party service provider. The cost may be provided, for example, to other entities such as, for example, the device provider, card issuer, card processor (which may be the same, for example, as the card issuer), or any other entity (e.g., card network).

Architecture 150 may be utilized with any card. Architecture 150 may include processor 120. Processor 120 may have on-board memory for storing information (e.g., notifications from third-party application developers). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data, for example, that is unique to a particular card. Memory 142 may include any type of data. For example, memory 142 may store discretionary data codes associated with buttons of a card (e.g., card 100 of FIG. 1). Such codes may be recognized by remote servers to effect particular actions. For example, a code may be stored on memory 142 that causes a third-party application to be executed by a remote server (e.g., a remote server coupled to a third-party service provider such as an online voucher or coupon provider). Different third-party applications may be associated with different buttons. Or, for example, a user may scroll through a list of third-party applications on a display on the front of the card (e.g., using buttons to scroll through the list). A user may select the type of payment on card 100 via manual input interfaces corresponding to displayed options on display 125. Selected information may be communicated to a magnetic stripe reader via a dynamic magnetic stripe communications device. Selected information may also be communicated to a device (e.g., a mobile telephonic device) having a capacitive sensor or other type of touch sensitive sensor.

A card may include, for example, any number of light sensors. Light sensors may be utilized such that a display screen, or other light emitting device, may communicate information to light sensors 127 via light. A card may include, for example, a battery 143.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device 101, 190 may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and/or 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Architecture 150 may also include, for example, a light sensor. Architecture 150 may receive information from a light sensor. Processor 120 may determine information received by a light sensor.

Other input/output device 172 may communicate with one or more wired networks and/or one or more wireless networks. Input/output device 172 may, for example, include a transceiver to communicate with a cellular station over a wireless radio interface. Input/output device 172 may, for example, include a transceiver to communicate with a wireless access point over a wireless interface, such as a Bluetooth interface or a Wi-Fi interface. Accordingly, for example, notifications from third-party application developers may be received from I/O device 172 and may be stored within memory 142 for future use.

Figure 2:
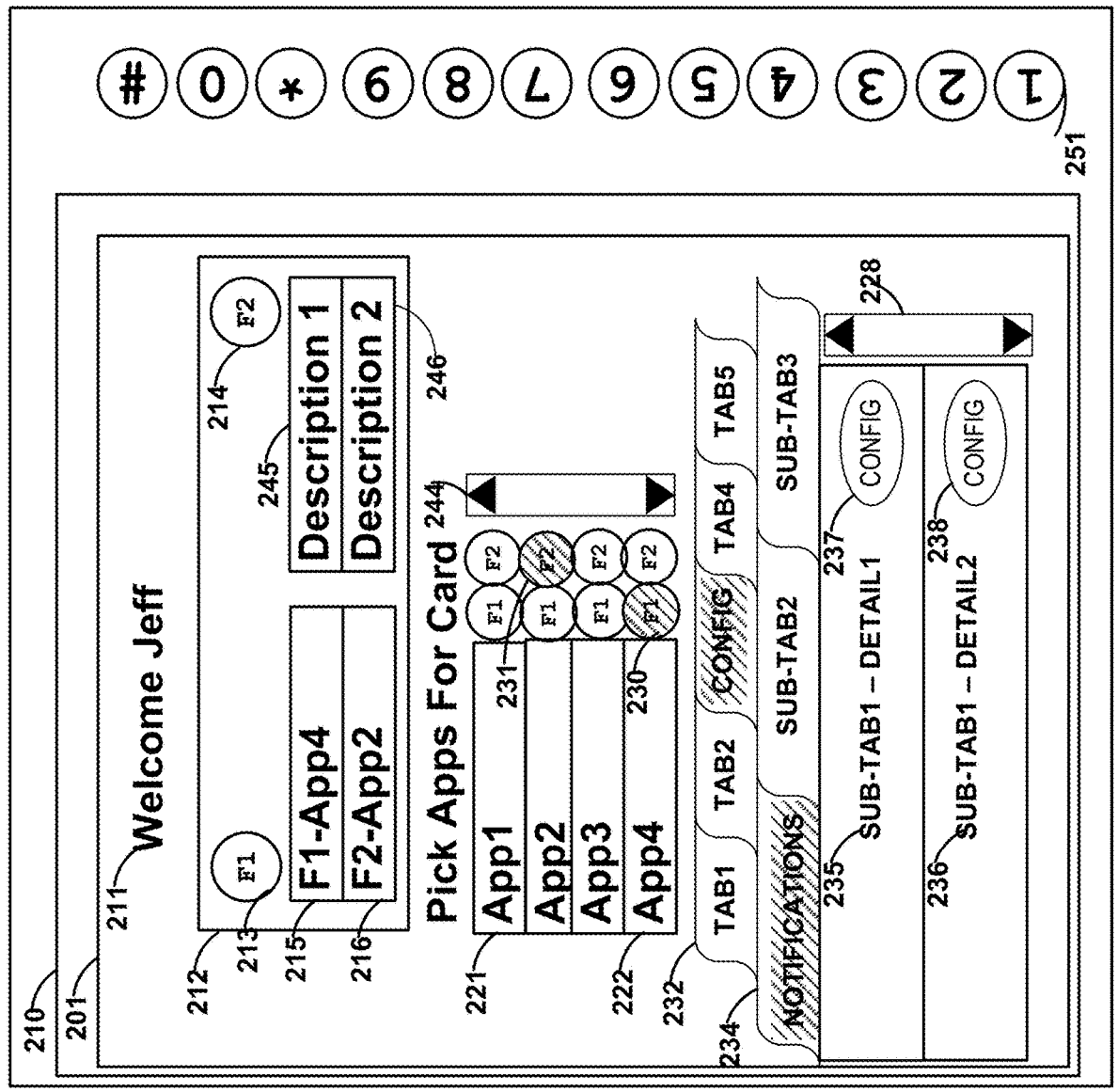
FIG. 2 is an illustration of a device constructed in accordance with the principles of the present invention.

FIG. 2 shows device 200. Device 200 may include one or more physical buttons 251, display screen 210 (e.g., a touch display screen such as a capacitive-touch or resistive-touch display screen), GUI 201 (e.g., a rendering of a web-based GUI), text 211, virtual card 212, virtual indicia 213 and 214, field descriptors 215 and 216, application description messages 245 and 246, applications 221-222, application selection buttons 230 and 231. Scroll bar 244 may allow multiple third-party applications to be displayed and selected via corresponding application selection buttons. Scroll bar 228 may allow multiple sets of sub-tab configuration details (e.g., notification configuration details for the applications selected via selection buttons 230 and 231).

Virtual tabs 232 and virtual sub-tabs 234 may be included to render information (e.g., third-party applications that have been associated with device 200) within sub-tab detail areas 235 and 236. Options 237 and 238 may be activated (e.g., via a mouse-over and click event) to configure detailed information for the associated applications (e.g., notification configuration details concerning associated third-party applications).

A user may associate a card, such as a powered or non-powered card, using a GUI for managing third-party applications. Such a GUI may be provided, for example, on a remote facility and displayed on a display to allow a user to change the third-party applications that may be associated with a card. In this manner, a user may utilize a GUI to be provided with an ecosystem of applications and may, for example, select, at any time, a particular application to associate with a card or a card button. Persons skilled in the art will appreciate that a default feature may be provided or that a number of features provided by a card issuer or entity may be provided in addition to third-party application functionality. For example, a card issuer may provide a card with a default on one button for credit and a default for a second button as decoupled debit. A user may press the first button to perform a credit transaction. A user may press the other button to perform a decoupled debit transaction.

Virtual card 212 may be provided as a representation of a user's physical card associated with a GUI. A user may be provided with the ability to change between multiple physical cards and configure the features associated with those multiple physical cards. Accordingly, virtual card 212 may be provided with indicia 213 in the configuration of, and indicative of, one physical button associated with a user's physical card and virtual card 212 may be provided with indicia 214 in the configuration of, and indicative of, another physical button associated with a user's physical card. Fields 215 and 216 may include the features associated with each button. Accordingly, a user may, for example, view virtual card 212 in order to refresh the user's memory of the features associated with the physical buttons on a user's physical card (not shown). GUI 201 may be, for example, provided as an application for a device (e.g., a portable computing device or a mobile telephonic device) or retrieved information from a web browser. Text 211 may, for example, identify the user associated with virtual card 212 and the corresponding physical card (not shown).

A list of applications may be provided on a display of a card or other device. A user may, for example, select different applications to be associated with a particular card or a particular button on a card. For example, selection 230 may associate the corresponding application to the physical button of a card associated with virtual button 213. Selection 231 may associate the corresponding application to the physical button of a card associated with virtual button 214. In doing so, a user may change the features of a card by using GUI 201. A physical card (not shown) may communicate information indicative of the button that was pressed with other payment data (e.g., an account number, security code, and other data). For example, information indicative of the button that was pressed may be included in discretionary data of a payment message. A payment message may be, for example, one or more tracks of magnetic stripe data (e.g., communicated from a dynamic magnetic stripe communications device), an RFID message (e.g., an NFC message from a radio frequency antenna), or an exposed IC chip message (e.g., an EMV message) from an exposed IC chip. Such information may be passed to a card issuer or processor from a point-of-sale terminal and any intermediary devices (e.g., a merchant acquirer processing server) and the information may be passed to a remote facility (e.g., a facility providing a GUI) such that the remote facility may determine the button that was pressed by a user. This remote facility may, in turn, retrieve information associated with the third-party application (or a feature of a card issuer, processor, application manager provider, or any entity) and forward information to that application provider such that the application may be executed. Additional information may be returned to the entity that provided the information indicative of the button the user pressed. Persons skilled in the art will appreciate that if, for example, a non-powered card is utilized, then information indicative that a purchase was made may be provided to an application manager provider such that the application manager provider can initiate the desired feature for the non-powered card. For non-powered cards, for example, features may be associated with different types of purchases such as, for example, one application may be provided for a particular merchant type (e.g., a game feature for gas purchases) and another application may be provided for a different merchant type (e.g., a reward feature for transportation purchases). Applications may be associated with other characteristics of a purchase such as, for example, a purchase above a particular amount (e.g., at or above $100) or a purchase below a particular amount (e.g., below $100). Such additional application selections may be provided, for example, for powered cards and devices.

GUI 201 may be provided, for example, on a card issuer's website such as, for example, on a bill statement web page. GUI 201 may be provided, for example, above the bill statement or to the right of the bill statement. Accordingly, for example, a user may utilize the GUI to manage application features when the user is logged into his/her account. Similarly, a third-party application provider may utilize GUI 201 as part of a user's administration or experience of that third party's service. Accordingly, for example, a user's profile page for a third party service may include GUI 201. In this manner, the GUI provider may provide web-code that retrieves GUI 201 from a remote facility managed by the GUI provider.

Tab selection 232 may be utilized by a user to render a configuration screen onto GUI 201 for associated third-party applications (e.g., third-party applications 235 and 236). Tab selection 234 may be utilized by a user to render a particular configuration screen (e.g., a notification configuration screen) onto GUI 201 for associated third-party applications (e.g., third-party applications 235 and 236). Scroll bar 228 may be utilized to scroll through multiple other third-party applications that may pertain to the sub-tab 234 selection. Control features 237 and 238 may, for example, render a notifications configuration screen onto display 210 so that the user may configure notification functionality from the associated third-party application providers.

A card may be provided with one button for a particular payment account (e.g., credit) and one button for a third-party application. Accordingly, a user may, for example, only need to remember one application associated with a card. A credit account may include rewards such as points, cashback, or miles from the card issuer. Accordingly, pushing the payment account button may earn the user such rewards. Pushing the third-party application button may, alternatively, for example, not earn the user such rewards and may instead initiate execution of the third-party application. In doing so, for example, the cost of providing a card may be reduced in that the cost of rewards for the card may be reduced. A third-party application may include, for example, a feature from the card issuer, such as the ability for a user to earn a particular amount of points (e.g., 100) for a particular dollar amount added to a purchase (e.g., $1).

A third-party application associated with a button may, for example, initiate an additional transaction (e.g., a piggyback transaction) to occur in addition to a purchase transaction being initiated by a card or device. For example, a button may be pressed and associated payment information may be communicated that may cause a third party to charge additional funds as a second transaction (e.g., a piggyback transaction) that may be associated with a first transaction. Accordingly, for example, a customer may receive goods and/or services from the third party once the piggyback transaction settles in addition to any goods and/or services that may have been purchased by the customer during the first transaction.

Figure 3:
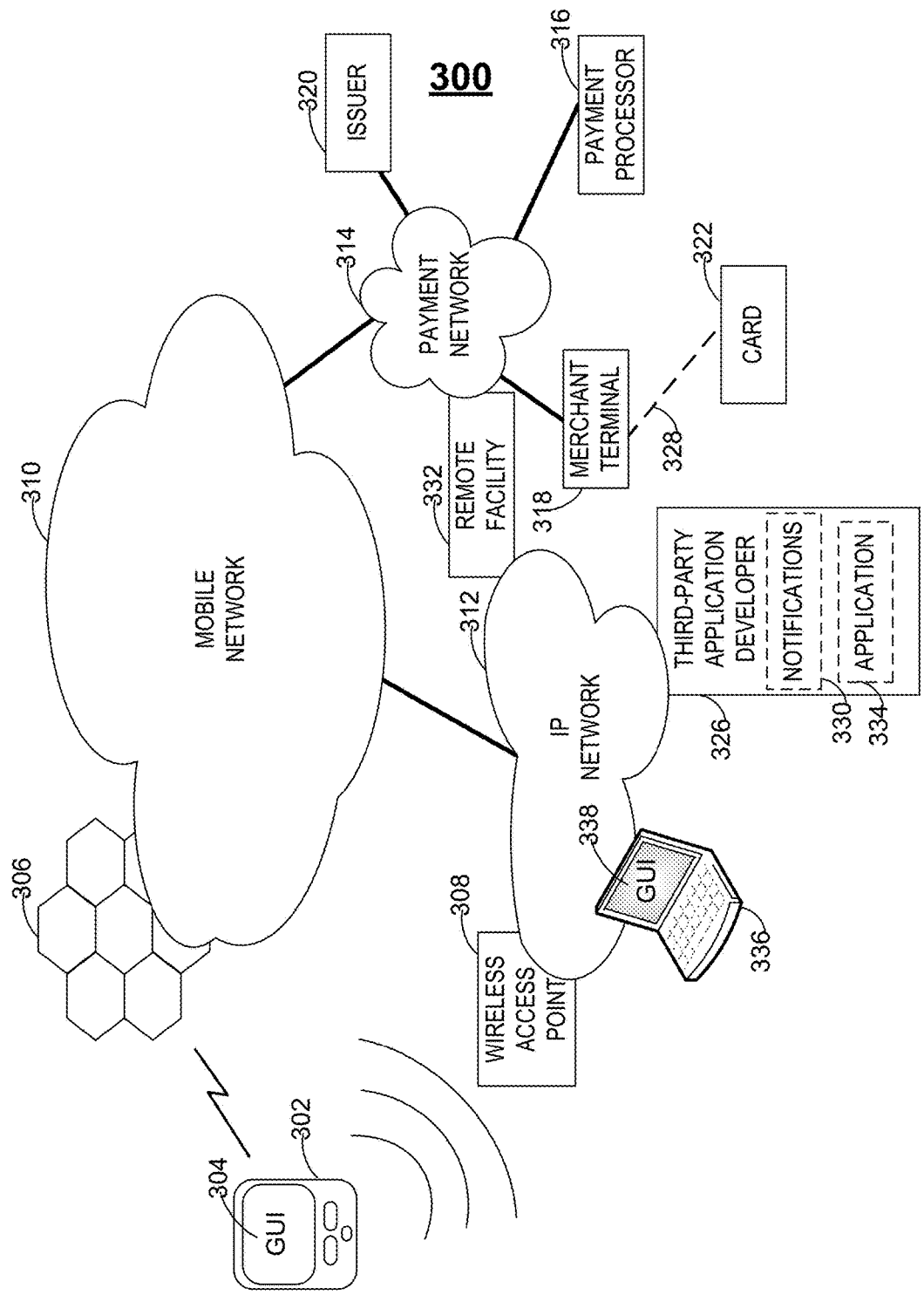
FIG. 3 is an illustration of a network constructed in accordance with the principles of the present invention.

FIG. 3 shows network 300 that may include, for example, device 302 (e.g., a card, a mobile telephonic device, a PDA, an electronic tablet, a laptop, a GPS unit, or an MP3 player). Device 302 may provide one or more transceivers that may communicate with one or more wired networks (e.g., IP network 312 and/or payment network 314) and/or one or more wireless networks (e.g., mobile network 310). Device 302 may, for example, communicate with a cellular station over a wireless radio interface (e.g., a GSM air interface) that may be used by device 302 to communicate information (e.g., voice and data) to cellular network access infrastructure 306 (e.g., one or more GSM base transceiver stations, base station controllers, and mobile switching centers). Persons skilled in the art will appreciate that cellular network access infrastructure 306 may utilize any multiple access architecture, such as for example, a code-division multiple access architecture and/or a time-division multiple access architecture.

Device 302 may, for example, communicate with wireless access point 308 over a wireless interface (e.g., a Bluetooth interface or a Wi-Fi interface). Accordingly, for example, device 302 may access one or more wired networks (e.g., IP network 312 and/or payment network 314) and/or one or more wireless networks (e.g., mobile network 310) without the need to first gain access to cellular network access infrastructure 306.

Payment information (e.g., a payment account number, a card expiration date and a third-party application code) may be communicated from device 302 in support of a financial transaction being conducted by device 302 (e.g., an online purchase transaction). In so doing, for example, items for purchase on IP network 312 (e.g., the internet) may be accessed by a browser of device 302 via an access point (e.g., wireless access point 308 or cellular network access infrastructure 306). Device 302 may, for example, complete a purchase transaction by communicating such payment information to network entities of payment network 314 (e.g., payment processor 316 and/or issuer 320).

Payment processor 316 may, for example, contact issuer 320 via a network (e.g., payment network 314) with payment information received from device 302 for authorization of a purchase. Once authorized, payment advice information may be forwarded from payment network 314 to remote facility 332. Remote facility 332 may then cause third-party application 334 to be executed based upon a third-party application code that may be contained within the payment advice information (e.g., discretionary data contained within a magnetic stripe message). Notifications 330 may be directed to device 302 and/or device 336 (e.g., via a short messaging service of mobile network 310 and/or an email delivery service of IP network 312) based upon an association established between third-party application 334, card or device 322 and/or device 302.

Network 300 may, for example, include merchant terminal 318 (e.g., a magnetic stripe reader, an EMV reader, an RFID reader, or an NFC reader) that may initiate transactions (e.g., point-of-sale transactions) and may complete such transactions via payment network 314. Payment network 314 may, for example, include issuers 320, merchant acquirers, processors, and/or other network entities (e.g., payment processor 316) that may be required to process, authorize, and/or settle transactions initiated by merchant terminal 318.

Remote facility 332 may, for example, receive messages from payment network 314 (e.g., from payment processor 316) that may be related to at least a portion of transactions conducted within payment network 314. Customers associated with remote facility 332 may, for example, elect to distribute at least a portion of data processed within payment network 314 and/or other data with various third-party applications 334 of network 312.

GUI 304 and/or 338 may be accessed by a user to, for example, define what data, if any, may be provided to remote facility 332 by payment network 314. A user may select at least a portion of the data provided by payment network 314 to remote facility 332 to be shared with third-party application 334.

GUI 304 and/or 338 may be used to define user preferences, which may determine how payment network 314, remote facility 332, network 312, and third-party application 334 interact for one or more transactions conducted by that user. A user may, for example, present a card (e.g., non-powered card 322) to merchant terminal 318 to complete a particular purchase transaction (e.g., using a magnetic stripe interface 328 or an RFID interface 328). User preferences within GUI 304 and/or 338 may, for example, be defined by the user to allow details of such a transaction to be communicated by payment network 314 to remote facility 332, which may then share at least a portion of such details and/or other details with one or more third-party applications 334. A user may, for example, present a card (e.g., powered card 322) to merchant terminal 318 to complete a purchase transaction. Prior to presentment, the customer may have selected (e.g., via one or more button presses on the powered card) one or more additional actions to be taken besides the processing of a purchase transaction by payment network 314 in accordance with the user preferences as selected by the user within GUI 304 and/or 338.

A user may, for example, press a button on a powered card that may be associated with communicating a payment message (e.g., a magnetic stripe message) to merchant terminal 318. Such a button press may, for example, further populate the magnetic stripe message (e.g., populate a discretionary data field within the magnetic stripe message) with a directive to share at least a portion of purchase transaction details conducted at merchant terminal 318 with a particular third-party application (e.g., application 334). User preferences may, for example, be selected within GUI 304 and/or 338 by the user to determine which actions are to be conducted by the one or more third-party applications.

A user may press a button on a powered card that in accordance with user preferences selected by GUI 304 and/or 338 may, for example, cause a data string to be communicated from payment network 314 (e.g., from payment processor 316) to remote facility 332 that may contain details of a purchase transaction initiated at merchant terminal 318. Remote facility 332 may, for example, compare user information (e.g., payment account number and/or payment account holder's name) that may be contained within the data string to a user database to obtain a customer ID (e.g., a customer token) that may be associated with the user information. Sensitive information within the data string (e.g., payment account number and/or payment account holder's name) may be replaced with the customer token and then stored either locally within remote facility 332 or remotely to remote facility 332.

The data string, for example, may further contain information that may be indicative of which button was pressed on the powered card before being presented to merchant terminal 318. Using the button press information in addition to the user preferences selected by GUI 304 and/or 338, remote facility 332 may populate a third-party message with details that may be communicated to a third-party application (e.g., application 334).

As per an example, a user may elect to share certain transaction information with a merchant each time a certain button is pressed on card 322 before presentment to merchant terminal 318 for payment. Such information may include, for example, merchant information (e.g., merchant's address), date/time information of the purchase, amount of the purchase, type of purchase made, and any other information (e.g., the customer ID associated with the customer's merchant account) that may be selected by the user via the user preferences selected within GUI 304 and/or 338. Accordingly, for example, the selected information may be automatically gathered by remote facility 332, populated within a third-party message and communicated to a third-party (e.g., third-party application 334) via a network (e.g., internet 312).

Upon receipt of the third-party message, third-party application 334 may initiate a second transaction (e.g., a piggy-back transaction). The second transaction may be communicated to remote facility 332 via network 312 and processed by remote facility 332 accordingly.

GUI 304 and/or 338 may, for example, be a GUI that may be rendered onto a display of a user's card or other device (e.g., a mobile telephonic device or laptop). One or more third-party applications may be featured applications within GUI 304 and/or 338. Such featured applications may be advertised by remote facility 332 via network 312 and GUI 304 and/or 338 so that the user may gain summary and/or detailed information concerning such featured applications. Based upon information gleaned from the detailed information concerning the featured applications, the user may be better informed as to which third-party applications he or she may wish to associate with his or her powered card, non-powered card or other device. Accordingly, the whimsical and festive nature of a user's experience with GUI 304 and/or 338 may be further enhanced.

Featured applications within GUI 304 and/or 338 may be further categorized into "currently featured" applications and "previously featured" applications. Currently featured applications may, for example, include one or more third-party applications that may have been flagged by remote facility 332 as being currently featured applications based upon one or more variables (e.g., the timing of the offering of the application, the popularity of the application, and the length of time that the application has been available). Previously featured applications may, for example, include one or more third-party applications that may have been flagged by remote facility 332 as being previously featured applications based upon one or more variables (e.g., previous membership as a currently featured application, the popularity of the application and the length of time that the application has been available).

Once a user has associated one or more third-party applications to his or her card or device, the user may experience that third-party application in accordance with preferences selected via GUI 304 and/or 338 after a transaction has been conducted with the user's card or device. The user may then rate the user's experience via GUI 304 and/or 338 using a numerical rating system, a textual rating system, or any other type of rating system. Such ratings may, for example, be stored within a ratings database (not shown) that may be local to, or remote from, remote facility 332. Accordingly, for example, other users accessing network 312 via their own GUI may then view the ratings stored within the ratings database to help them make their own decisions as to whether they wish also to associate a particular third-party application to their card or device.

As per an example, a first user may associate a third-party application to his or her card or device and then may conduct a purchase transaction with the card or device. A transaction may be completed (e.g., a toy car donation may be made to the Toys for Tots foundation) in addition to the purchase transaction that was completed using the user's card or device. Once the charity donation is made, the user may access GUI 304 and/or 338 to rate the Toys for Tots application experience. The rated application experience may then be stored within a ratings database (not shown) for access by any other user with access to the ratings database via a network (e.g., internet 312).

A third-party application developer (e.g., developer 326) may provide notifications 330 (e.g., via email, text messaging or any other form of communication) to users (e.g., users accessible via internet 312). Issued notifications may be rendered onto the user's device via GUI 304 and/or 338. Issued notifications may be communicated to the user via other mediums (e.g., included on a user's on-line statement, included within a user's printed statement, or posted onto a user's social networking site).

A user may, for example, configure how they wish to receive notifications from third-party application developers or if they wish to receive them at all. Remote facility 332 may, for example, receive configuration information from users' GUI-based configuration screens (e.g., GUI 304 and/or GUI 338 configuration screens) via network 312 concerning the users' notification preferences.

All notification messages may, for example, be sent to each user by third-party notifications 330 via remote facility 332. Remote facility 332 may impose rules onto third-party application developer 326 as to the nature of such notifications (e.g., authorization to send notifications to a user and authorization of the frequency that notification messages may be sent to a particular user).

For example, remote facility 332 may disallow notification message 330 from third-party application developer 326 to any users that have not associated third-party application 334 from third-party application developer 326. As per another example, remote facility 332 may limit the number (e.g., one per quarter) of notifications (e.g., notifications 330) that may be sent by a third-party application developer (e.g., third-party application developer 326) to any one user. Remote facility 332 may, for example, impose a fee (e.g., a $0.10 fixed fee) upon a third-party application developer (e.g., third-party application developer 326) for each notification (e.g., notifications 330) that remote facility 332 processes for each third-party application developer.

Figure 4:
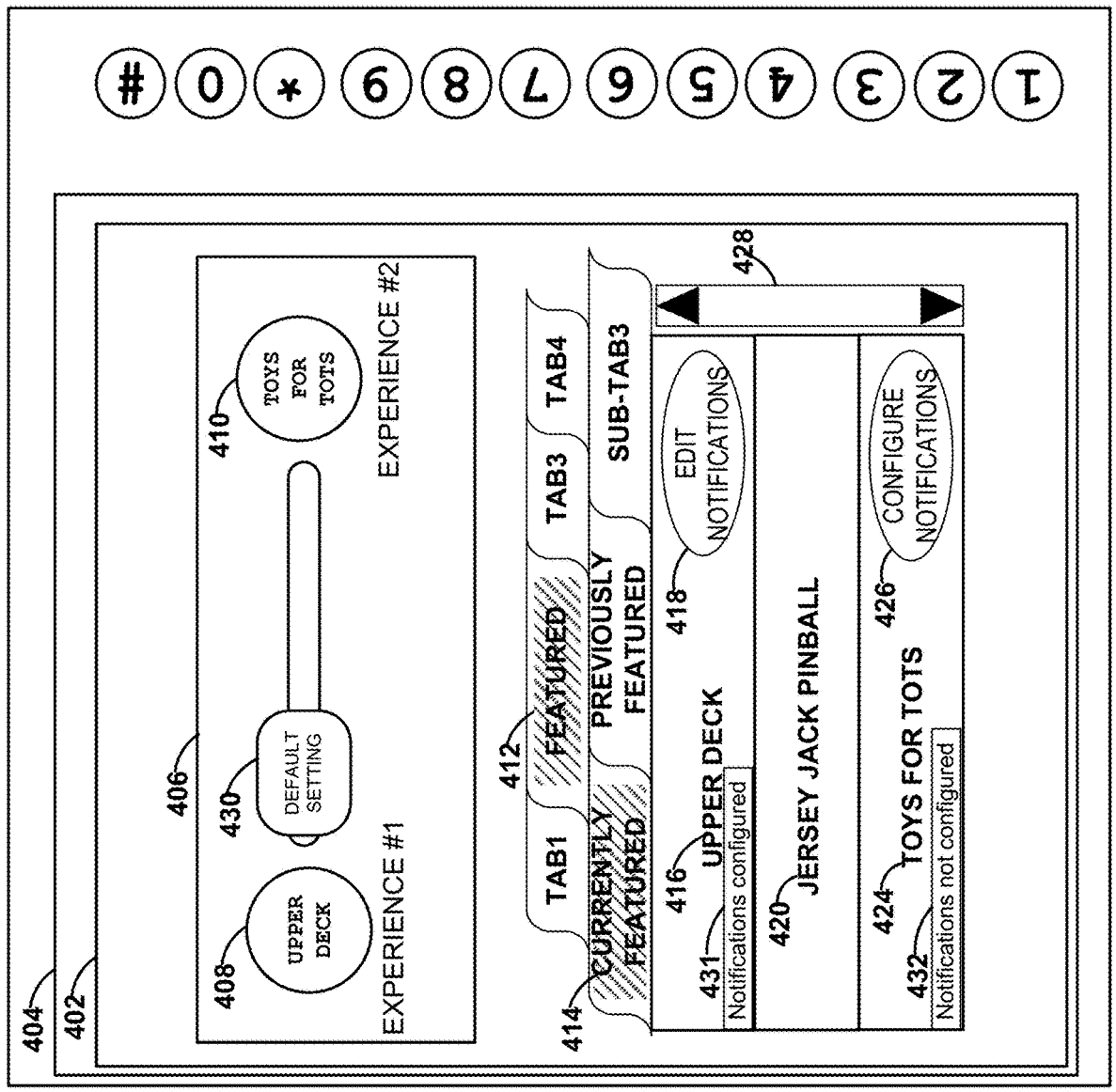
FIG. 4 is an illustration of a device constructed in accordance with the principles of the present invention.

FIG. 4 shows device 400 (e.g., a card, a mobile telephonic device, a laptop computer, a desktop computer or an electronic tablet) that may include display 404. Device 400 may include a processor that may render GUI 402 onto display 404. GUI 402 may represent one or more components of a GUI that may allow a user of device 400 to select various aspects of that user's experience when using either of a powered or a non-powered card.

Virtual card 406 may be rendered onto GUI 402 and virtual card 406 may be a virtual representation of a user's physical card. Accordingly, for example, the functionality of virtual button 408 and virtual button 410 may be established via GUI 402, such that when the user utilizes (e.g., during processing of a purchase transaction) his or her physical card that is associated with virtual card 406, the established functionality may be performed.

As per an example, the functionality of a third-party application (e.g., UpperDeck 416) may be associated with virtual button 408 via GUI 402 and the functionality of a different third-party application (e.g., Toys for Tots 424) may be associated with virtual button 410 via GUI 402. Accordingly, when the user's physical card is used (e.g., during a purchase transaction) and either of the physical buttons corresponding to virtual buttons 408 or 410 are pressed on the user's physical card, the functionality associated with the selected third-party application may be executed in addition to the completion of the purchase transaction.

A user's non-powered card may be similarly used. Slide bar 430, for example, may be adjusted via GUI 402, where slide bar 430 is either adjusted to exist in proximity to virtual button 408 or is adjusted to exist in proximity to virtual button 410. The proximate location of slide bar 430 may, therefore, select the default functionality of the user's card. As per one example, a user's card may be a non-powered card. Accordingly, the non-powered card may be used to execute additional functionality as defined by slide bar 430 such that if slide bar 430 is proximate to virtual button 408, then a third-party application (e.g., upper deck 416) is executed in addition to the transaction conducted using the user's non-powered card. Alternately, if slide bar 430 is proximate to virtual button 410, then a third-party application (e.g., Toys for Tots 424) is executed in addition to the transaction conducted using the user's non-powered card.

On-line purchases may also be used to initiate additional functionality. If either of the user's powered card or non-powered card is used for online purchases, for example, then the proximate location of slide bar 430 may be similarly used to select the functionality desired. If slide bar 430 is proximate to virtual button 408, for example, then a third-party application (e.g., upper deck 416) is executed in addition to the transaction conducted online. Alternately, if slide bar 430 is proximate to virtual button 410, then a third-party application (e.g., the Toys for Tots 424) is executed in addition to the transaction conducted online.

GUI 402 may, for example, provide guidance to the user of device 400 as to which third-party applications are featured (e.g., which third-party applications are available to be associated with a user's powered or non-powered card). For example, a user may mouse over and click on a navigational tab (e.g., featured tab 412) and the user may further mouse over and click on a navigational sub-tab (e.g., currently featured sub-tab 414). In so doing, the user may cause those third-party applications having a flagged status (e.g., a currently featured flagged status) to be listed (e.g., next to scroll bar 428). A currently featured flagged status may, for example, indicate to the user of device 400 that the currently featured third-party applications are currently featured for any one or more reasons (e.g., the third-party applications are relatively newly offered third-party applications, the third-party applications have not been featured within a threshold amount of time, the third-party applications are rated highly, or the third-party applications are sought to receive higher visibility).

A user may obtain status, for example, as to whether a currently featured third-party application had been previously associated with a user's powered or non-powered card and whether notifications from the third-party application provider had been configured by the user. Status 431 and 432 may, for example, be tagged onto a listing of currently featured third-party applications so as to provide the user with a feedback status as to whether one or more currently featured third-party applications have been previously associated by the user to the user's powered or non-powered card and/or whether notifications from the third-party application providers have been configured by the user.

If notifications have not been configured, for example, then a control feature (e.g., button 426) may be moused-over and clicked by a user of device 400 to proceed to a notification configuration GUI for that particular third-party application provider (e.g., the Toys for Tots application provider). If notifications have been configured, for example, then a control feature (e.g., button 418) may be moused-over and clicked by a user of device 400 to proceed to a notification configuration GUI for that particular third-party application provider (e.g., the Toys for Tots application provider) so that previously configured notification controls may be edited by the user if desired. Third-party applications not previously associated (e.g., Jersey Jack Pinball 420) by a user to his or her card or device, for example, may have default notification configuration controls selected for the user by a remote facility (e.g., the user is to receive no notifications from the un-associated third-party application).

Figure 5:
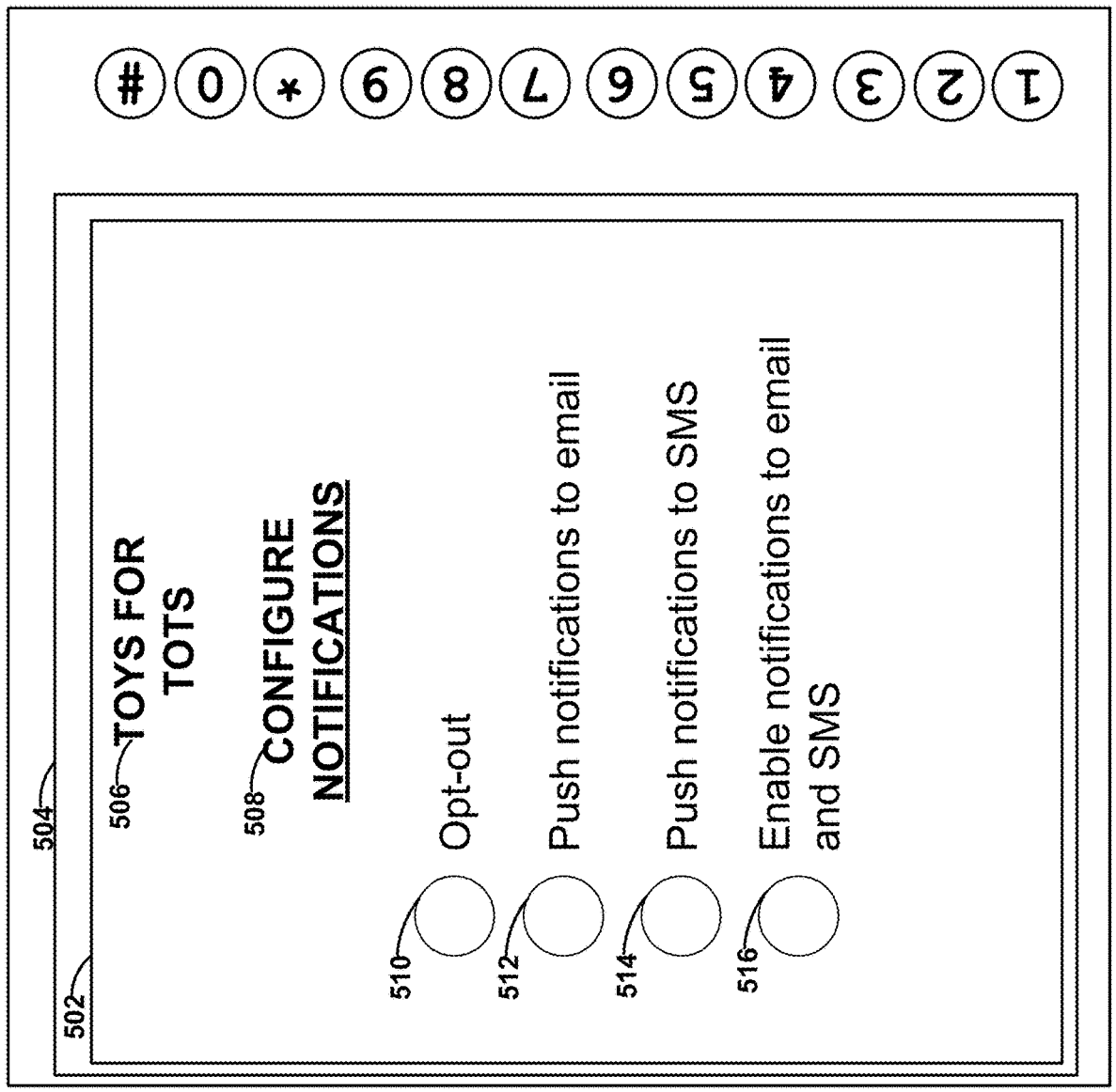
FIG. 5 is an illustration of a device constructed in accordance with the principles of the present invention.

FIG. 5 shows device 500 (e.g., a card, a mobile telephonic device, a laptop computer, a desktop computer or an electronic tablet) that may include display 504. Device 500 may include a processor that may render GUI 502 onto display 504. GUI 502 may represent one or more components of a GUI that may allow a user of device 500 to, for example, configure how notifications may be sent to the user of device 500.

Text portion 506 may, for example, provide a user of device 500 with configuration information concerning a third-party application (e.g., Toys for Tots 506). Area 508 may, for example, provide a textual description of the controls provided by GUI 502 (e.g., a configuration GUI that allows a user of device 500 to control a notification configuration that may be imposed upon the third-party application provider of third-party application 506).

Control input 510 (e.g., a radio button) may be activated (e.g., with a mouse-over and click) to allow a user of device 500 to opt out of third-party notifications. Accordingly, for example, even though a user may have associated third-party application 506 to his or her card, a user may nevertheless deny a third-party application provider from providing notifications to a user of device 500.

Control input 512 (e.g., a radio button) may be activated (e.g., with a mouse-over and click) to allow a user of device 500 to select a medium to be used for third-party notifications. In so doing, for example, a user may direct a third-party application provider to provide notifications to a user of device 500 via email.

Control input 514 (e.g., a radio button) may be activated (e.g., with a mouse-over and click) to allow a user of device 500 to select a different medium to be used for third-party notifications. In so doing, for example, a user may direct a third-party application provider to provide notifications to a user of device 500 via a text messaging service (e.g., SMS).

Control input 516 (e.g., a radio button) may be activated (e.g., with a mouse-over and click) to allow a user of device 500 to select more than one medium to be used for third-party notifications. In so doing, for example, a user may direct a third-party application provider to provide notifications to a user of device 500 via email and a text messaging service (e.g., SMS).

Figure 6:
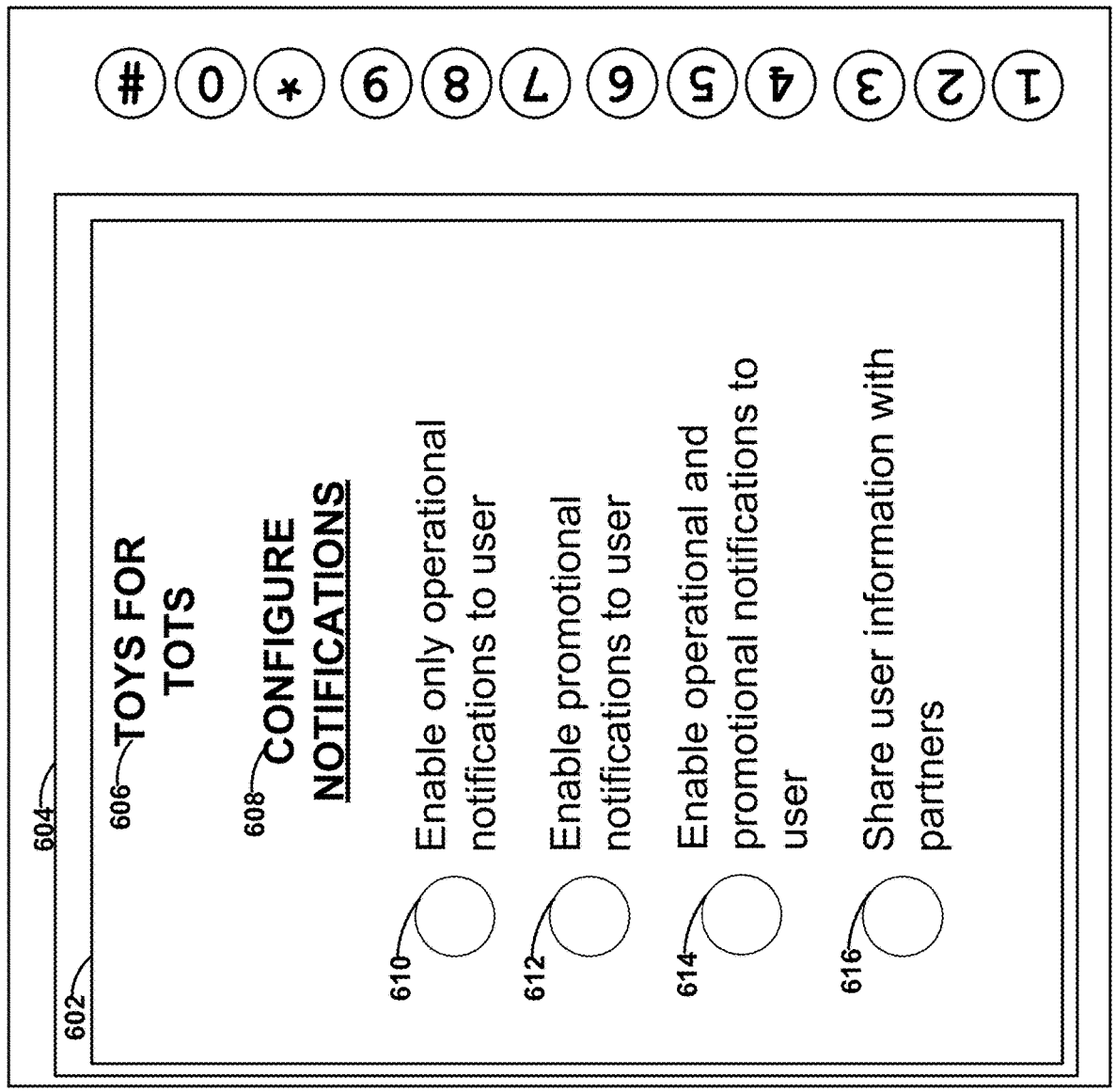
FIG. 6 is an illustration of a device constructed in accordance with the principles of the present invention.

FIG. 6 shows device 600 (e.g., a card, a mobile telephonic device, a laptop computer, a desktop computer or an electronic tablet) that may include display 604. Device 600 may include a processor that may render GUI 602 onto display 604. GUI 602 may represent one or more components of a GUI that may allow a user of device 600 to, for example, configure which notification types may be sent to the user of device 600 and/or others.

Text portion 606 may, for example, provide a user of device 600 with configuration information concerning a third-party application (e.g., Toys for Tots 606). Area 608 may, for example, provide a textual description of the controls provided by GUI 602 (e.g., a configuration GUI that allows a user of device 600 to control a notification configuration that may be imposed upon the third-party application provider of third-party application 606).

Control input 610 (e.g., a radio button) may be activated (e.g., with a mouse-over and click) to allow a user of device 600 to enable only operational notifications to be sent to the user. Accordingly, for example, even though a user may have opted into receiving notifications from a third-party application provider, a user may nevertheless deny a third-party application provider from providing notifications to a user of device 600 that are not operational (e.g., notifications that are promotional in nature).

Control input 612 (e.g., a radio button) may be activated (e.g., with a mouse-over and click) to allow a user of device 600 to activate promotional third-party notifications. In so doing, for example, a user may allow a third-party application provider to provide notifications to a user of device 600 that are promotional (e.g., notifications that are not operational in nature).

Control input 614 (e.g., a radio button) may be activated (e.g., with a mouse-over and click) to allow a user of device 600 to allow both operational and promotional notifications to be sent to a user of device 600 by a third-party application provider. In so doing, for example, a user may allow a third-party application provider to provide notifications to a user of device 600 that are both operational and promotional in nature.

Control input 616 (e.g., a radio button) may be activated (e.g., with a mouse-over and click) to allow a user of device 600 to notifications to be sent to partners of the third-party application provider. In so doing, for example, a user may allow a third-party application provider to provide notifications to partners of the third-party application provider when such notifications are warranted. For example, a welcome notification may be sent to a user of device 600 when the user associates third-party application 606 to the user's card or device. If the user activates selection 616 then, for example, the third-party application provider may also send a notification to partners (e.g., a Like notification to the user's Facebook page).

Figure 7:
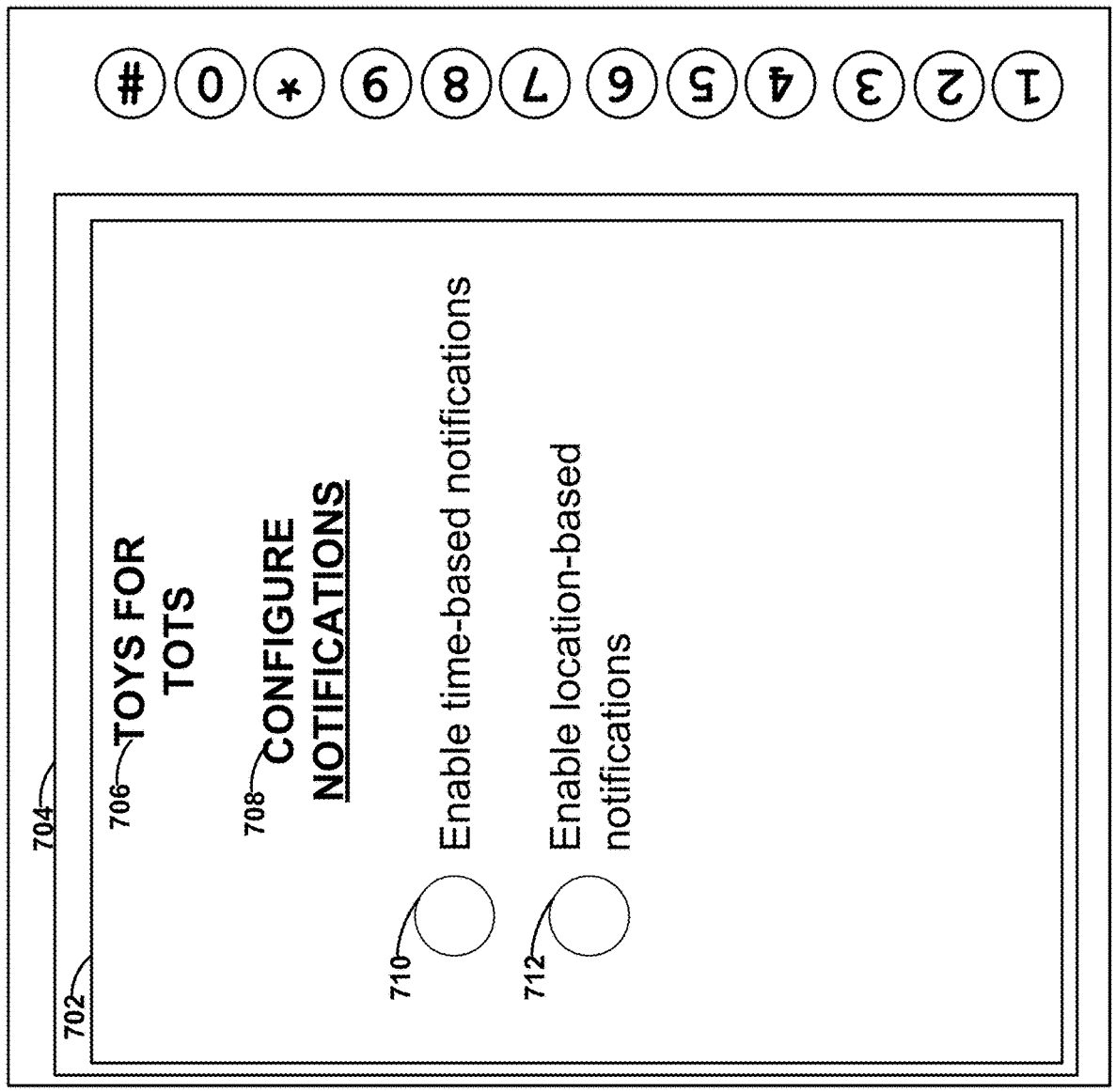
FIG. 7 is an illustration of a device constructed in accordance with the principles of the present invention.

FIG. 7 shows device 700 (e.g., a card, a mobile telephonic device, a laptop computer, a desktop computer or an electronic tablet) that may include display 704. Device 700 may include a processor that may render GUI 702 onto display 704. GUI 702 may represent one or more components of a GUI that may allow a user of device 700 to, for example, configure which notification types may be sent to the user of device 700.

Text portion 706 may, for example, provide a user of device 700 with configuration information concerning a third-party application (e.g., Toys for Tots 706). Area 708 may, for example, provide a textual description of the controls provided by GUI 702 (e.g., a configuration GUI that allows a user of device 700 to control a notification configuration that may be imposed upon the third-party application provider of third-party application 706).

Control input 710 (e.g., a radio button) may be activated (e.g., with a mouse-over and click) to allow a user of device 700 to enable time-based notifications to be sent to the user. Accordingly, for example, even though a user may have opted into receiving notifications from a third-party application provider, a user may require that such notifications be limited to a number (e.g., one) notification in a given period of time (e.g., 3 months).

Control input 712 (e.g., a radio button) may be activated (e.g., with a mouse-over and click) to allow a user of device 700 to activate location-based notifications. In so doing, for example, a user may allow a third-party application provider to provide notifications to a user of device 700 that are based upon a user's geographical position (e.g., the user's geographical position with respect to any entity that may be associated with third-party application 706.

As per an example, device 700 may include a position determination device (e.g., a GPS device) that may track the user's location. Such location information may be provided by device 700 to the third-party application provider associated with third-party application 706, such that when the user is proximate to a location of interest (e.g., a Toys for Tots drop off location), a notification may be sent to device 700 by the Toys for Tots application provider.

Accordingly, for example, a user may be reminded that he or she is proximate to a Toys for Tots drop off location and may be notified that a donation could be easily and conveniently made by the user due to the user's convenient co-location with the Toys for Tots location.

Figure 8:
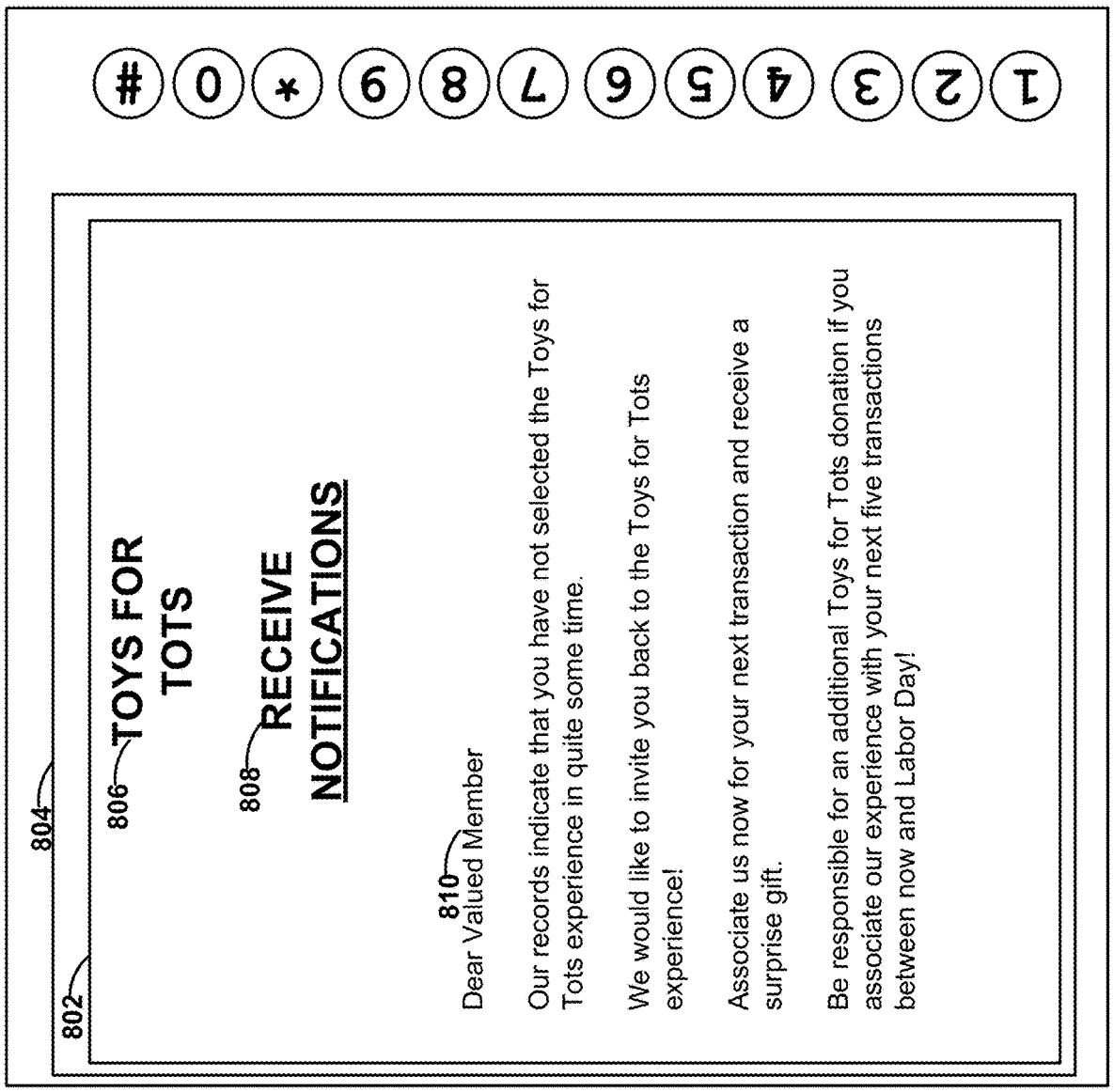
FIG. 8 is an illustration of a device constructed in accordance with the principles of the present invention.

FIG. 8 shows device 800 (e.g., a card, a mobile telephonic device, a laptop computer, a desktop computer or an electronic tablet) that may include display 804. Device 800 may include a processor that may render GUI 802 onto display 804. GUI 802 may represent one or more components of a GUI that may allow a user of device 800 to, for example, read notifications sent to a user of device 800 by a third-party application developer.

Text portion 806 may, for example, provide a user of device 800 with notification information concerning a third-party application (e.g., Toys for Tots 806). Area 808 may, for example, provide a textual description of the notification type (e.g., a notification received from a third-party application provider of third-party application 806).

Text portion 810 may be provided as the body portion of the notification sent by the third-party application provider. A third-party application provider may, for example, track a number of transactions conducted by a user that has associated third-party application 806 with the card or device that was used to conduct the transactions. Given that the number of tracked transactions fall below a threshold number, for example, the third-party application provider may send notification 810 to the user via a remote facility.

The third-party application provider may, for example, be limited by the remote facility (e.g., only a single notification 810 may be sent to the user via the remote facility within any 3-month period). The remote facility may, for example, charge a fee (e.g., a $0.15 flat fee) for each notification sent to a user via the remote facility.

Persons skilled in the art will also appreciate that the apparatus of the present invention may be implemented in other ways then those described herein. All such modifications are within the scope of the present invention, which is limited only by the claims that follow.

What is claimed is:

1. A notification system comprising:
   a physical payment device comprising:
   a physical payment card housing;
   a display contained within said housing;
   at least one mechanical button contained within said housing that is operable to turn said physical payment device ON and OFF;
   a dynamic magnetic stripe communications device operable to communicate with a read-head of a conventional credit card reader;
   a source of power to power said dynamics magnetic stripe;
   a processor within said housing operable to execute a graphical user interface on the display that comprises a virtual payment card and at least one virtual button, wherein said virtual payment card is associated the physical payment device; and
   a third-party application executed by using said physical payment device to complete a purchase transaction selected by a user manipulating the at least one button on the display that creates purchase transaction information which is directly related to the purchase transaction,
   wherein a provider of said third-party application creates non-purchase information and sends a notification that includes a feature unrelated to confirming the purchase to said processor on said physical payment device based on said purchase transaction said notification readable from said graphical user interface which is presented on said display,
   said notification includes said feature.

2. The notification system of claim 1, wherein the provider of said third party application is other than a payment processor.

3. A method comprising:
   receiving, via a server, purchase transaction information directly related to a purchase at a remote facility, wherein said purchase transaction information is associated with a user manipulating at least one mechanical button on a display of a physical payment device having a housing, said mechanical button being contained within said housing, to select and complete said purchase transaction by transmitting payment information from a dynamic magnetic stripe embedded within said housing of said physical payment device to a read-head of a conventional credit card reader and said physical payment device is associated with a virtual payment card that is presented on said display;
   executing a third-party application based on said purchase occurring that creates non-purchase information; and
   communicating, via a server, a third-party notification based on said non-purchase information from a provider of said third-party,
   wherein said notification includes a feature that is presented on said display, and
   said feature is unrelated to payment confirmation information.

\* \* \* \* \*